(12) United States Patent
Hölscher et al.

(10) Patent No.: US 7,640,888 B2
(45) Date of Patent: Jan. 5, 2010

(54) METHOD FOR OPERATING A MILKING FACILITY, IN ADDITION TO CORRESPONDING MILKING FACILITY

(75) Inventors: Frank Hölscher, Rheda-Wiedenbrück (DE); Karsten Schönrock, Hagen (DE); Peter Kaever, Oelde (DE)

(73) Assignee: GEA WestfaliaSurge GmbH, Bonen (DE)

(*) Notice: Subject to any disclaimer, the term of this patent is extended or adjusted under 35 U.S.C. 154(b) by 659 days.

(21) Appl. No.: 10/508,204

(22) PCT Filed: Mar. 20, 2003

(86) PCT No.: PCT/EP03/02936

§ 371 (c)(1),
(2), (4) Date: Mar. 29, 2005

(87) PCT Pub. No.: WO03/079772

PCT Pub. Date: Oct. 2, 2003

(65) Prior Publication Data

US 2005/0166851 A1    Aug. 4, 2005

(30) Foreign Application Priority Data

Mar. 22, 2002    (DE)    .............................. 102 12 676

(51) Int. Cl.
*A01J 5/003* (2006.01)
(52) U.S. Cl. ................................................. 119/14.04
(58) Field of Classification Search .............. 119/14.04, 119/14.03, 840, 843, 753; 52/31
See application file for complete search history.

(56) References Cited

U.S. PATENT DOCUMENTS

| 3,835,814 A | * | 9/1974 | Jacobs et al. ............. 119/14.04 |
| 3,934,551 A | * | 1/1976 | Sulzberger ............... 119/14.04 |
| 5,066,857 A | | 11/1991 | Ernst | |
| 5,687,673 A | * | 11/1997 | Bowers .................... 119/14.04 |
| 6,802,280 B2 | * | 10/2004 | M.ang.rtensson ........ 119/14.04 |
| 7,104,218 B2 | * | 9/2006 | Teckentrup et al. ...... 119/14.02 |
| 2003/0183173 A1 | * | 10/2003 | Eriksson .................. 119/14.04 |
| 2004/0020442 A1 | * | 2/2004 | Mrtensson ............... 119/14.04 |
| 2004/0050331 A1 | * | 3/2004 | Hein et al. ............... 119/14.04 |
| 2004/0134432 A1 | * | 7/2004 | Teckentrup et al. ...... 119/14.04 |
| 2005/0051105 A1 | * | 3/2005 | Hein et al. ............... 119/14.04 |
| 2005/0120965 A1 | * | 6/2005 | Van Den Berg et al. .. 119/14.02 |

FOREIGN PATENT DOCUMENTS

DE    26 50 741 A1    5/1977
DE    41 01 530 A1    7/1992

(Continued)

OTHER PUBLICATIONS

Excerpts from QM-Lexicon (online, www.quality.de/lexicon) dated Nov. 9, 2006 (8pgs).

(Continued)

*Primary Examiner*—Yvonne R. Abbott
(74) *Attorney, Agent, or Firm*—Smith Law Office

(57) ABSTRACT

The invention relates to a method for operating a carousel milking facility (1) comprising a plurality of milking stations (3), which are arranged on a platform (2). According to said method, a positional modification of the platform (2) is determined in relation to a reference point and the position of at least one milking station (3) can be calculated.

23 Claims, 4 Drawing Sheets

FOREIGN PATENT DOCUMENTS

| | | |
|---|---|---|
| DE | 199 36 909 C1 | 6/2001 |
| DE | 100 31 969 A1 | 2/2002 |
| EP | 0 689 762 A1 | 1/1996 |
| EP | 0 717 590 B1 | 6/1997 |
| EP | 1 298 983 B1 | 8/2004 |
| GB | 1 398 596 | 6/1975 |
| WO | WO 95/07019 | 3/1995 |
| WO | WO 97/37530 | 10/1997 |
| WO | WO 00/74472 A1 | 12/2000 |
| WO | WO 02/03783 A1 | 1/2002 |

OTHER PUBLICATIONS

Alfa Laval Agri, Documentation of Products AGS 201, Nov. 16, 2006, 9pgs.

DeLaval Affidavit of Patrik Plensners dated Nov. 20, 2006, 1pg.

Letter to European Patent Office from Karsten Schmidt of Albihns GmbH dated Nov. 28, 2006, 11pgs.

Letter to European Patent Office from F.J.A. de Groen of Octrooibureau Van Der Lely NV dated Nov. 30, 2006, 5pgs.

DeLaval, ALPRO System-Instruction Book (90862301), 27pgs.

DeLaval, ALPRO Sytem-System Book (90862401), 40pgs.

* cited by examiner

METHOD FOR OPERATING A MILKING FACILITY, IN ADDITION TO CORRESPONDING MILKING FACILITY

The object of the invention refers to a method for the operation of a milking facility as well as to a milking facility according to the Main Clause of patent claim 11.

Although, the invention is described below with reference to use in carousel milking facilities, it is pointed out that a milking facility according to the invention can also be equipped with other movable transport devices. The method according to the invention can also be used in other milking facilities, for example, in milking facilities in which the animals to be milked are arranged on conveyor belts, for example, to be moved from the entry to the exit.

Furthermore, the invention is suitable not only for use in milking facilities for the milking of cows, but also for the milking of other milk-producing animals, for example, mares, donkeys, goats, sheep, camels, dromedaries, yaks, elk and similar.

Carousel milking facilities are known for the milking of animals, especially for the milking of cows. Such carousel milking facilities can have a great variety of design. For example, a carousel milking facility is known from DE 26 50 741 A1, which has several milking stations arranged on a platform. This milking facility is the so-called side-by-side carousel milking facility. The animals are led radially inward to the milking stations. For this purpose, a gate, which makes entry into the milking station possible, is pulled up. After the cow enters the milking station, the gate is lowered again. The platform with the individual milking stations is moved further.

From DE 41 01 530 A1, another embodiment of the carousel milking facility is known. This has a rotatable platform on which several milking stations are arranged. In order to drive the platform, which has a segmented design, a drive is provided which is formed from one or several hydraulic motors and a hydraulic pump driven by an electric motor.

In the course of automation of milking, as well as monitoring the animals regarding their milk output and health, it has become known that the animals can be provided with an animal recognition unit. The animal recognition unit can contain a multiplicity of information about the animals.

For safe assignment of the data obtained during a milking process to a particular animal, it is necessary to note the milking station on which the animal is located. The position recognition can, for example, be realized by position responders. The position responders are arranged on the milking stations of the installation. A pass-by antenna locates the position responder when it moves past it. The responder code of the position is transmitted to a computer and assigned to the particular position.

Regarding the fact that the resolution is relatively low, additional sensors were incorporated for detection at certain critical points, for example, the sensors can be light sensors.

Such an arrangement of sensors at critical points is known from EP 0 717 590 B1. These sensors form a part of a control and drive device for a carousel milking facility. According to EP 0717 590 B1, a first control point is provided for monitoring the position of the teat cup cluster. Looking at it in the direction of rotation, a second control point is arranged after the first control point. The speed of the platform is adjusted with the control and guide device in such a way that, at the first control point, the majority of teat cup clusters has not been pulled down yet and that at the second control point, the majority of teat cup clusters has been pulled down.

A problem in the known carousel milking facilities is that the position determination of the individual milking stations can be done only insufficiently during the operation of a carousel milking facility or it can be done with a very high technical expenditure.

With this starting point, the present invention is based on the goal to provide a method for the operation of a milking facility as well as to provide a milking facility, through which or a (relatively accurate) determination of the position of the platform during the operation of the milking facility becomes possible. Preferably the expenditure for technical aspects and apparatuses for the determination of the position of a milking parlor should be reduced.

This task is solved by the method according to claim 1 and/or by a milking facility according to claim 11. Advantageous further developments and embodiments of the method or of the milking facility are the objects of the dependent patent claims.

The method for the operation of a milking facility with at least one, preferably with at least two or even with a multiplicity of milking stations, which are arranged on a movable (for example, rotatable) platform, is characterized by the fact that a change of the position of the platform relative to a reference point is determined by a position detection unit.

The invention has many advantages.

In a preferred further development, the position detection unit is designed as a central position detection unit.

In a preferred further development, a change in an angle is determined by the (central) position detection unit.

In a preferred further development, the method is used for the operation of a carousel milking facility.

Among others, the invention provides the advantage that, at any time, even after (a long) shutdown or complete shutdown of the milking facility, the accurate position of the facility is known without any expensive recalibration being necessary. In such a recalibration, in conventional installations, first a "zero point" is searched, in order to derive the actual position or angle of the facility using a time and velocity measurement.

In a preferred further development of the invention or in one of the previously described further developments, the position of at least one milking station is determined. This creates the possibility of identifying at least one milking station by determining its position. Since the milking stations are arranged on the platform in a predetermined geometric arrangement with respect to one another, the position of individual other or all milking stations can be determined relative to the reference point. Knowledge of the position of at least one milking station relative to a reference point also has the advantage that it can be determined reliably as to what extent the platform should be turned further after interruption of the rotational movement in order to make it possible for an animal to enter or leave a milking station.

In a further preferred embodiment of the invention or in one of the further developments described before, an angle change is determined. Here it is preferable, to determine the change of angle or alteration of the angle in order to change the position. Additional determination or detection of an angle change is also possible.

With the use of the central position detection unit, increased safety is achieved with regard to the determination of the position change or angle change, since it is not necessary to use a multiplicity of devices for the determination of the position change or angle change. As a result of this, the expenditure for the apparatus for carrying out the method is reduced.

According to an advantageous further development, it is proposed that the velocity of position change or angular velocity of the platform be determined. This further development of the method also has the advantage that very accurate control of setting of the (angular) velocity of the platform can be achieved.

Especially, according to another advantageous embodiment of the method, it is proposed that the (angular) velocity of the platform be changeable as a function of the operational situation in at least one milking station. Operational situation is defined and any state within the milking carousel. The operational situation can be described, for example, by the number of occupied milking stations, by the number of still to be performed or already completed milking processes during a resolution of the platform. Here, we can deal with a reduction or with an increase of the angular velocity. A reduction of the angular velocity of the platform can be expedient when the milking time necessary for the cows located at the milking stations is greater than the possible residence time of individual cows on the platform. An increase of the angular velocity may be necessary when the milking time, which is required for milking the animals located on the platform, is smaller than the residence time of the animal, calculated from the actual angular velocity during a process section between the entry and exit.

In order to determine the angular change, according to a still other advantageous embodiment of the method, it is proposed that at least one central unit or an angle sensor be provided, whereby the data of the angle sensor are transmitted to a control device. The control device can serve for control and/or regulation, that is, it has to be designed as a control and/or regulating unit.

The angle sensor is preferably a shaft encoder. Here, absolute shaft encoders, but also incremental encoders, can be used. Multi-turn shaft encoders can also be used.

Preferably, the angle change is determined with at least angle encoder, especially with an absolute angle encoder. The angle encoder can also be an incremental angle encoder.

The angle output can be analog or digital. Angle encoders are advantageous, while in the analog method, time changes of the signal are possible.

For example, an optical sensor can also be considered for position determination. For example, on the outer periphery of a carousel, a periodic, for example, sinusoidal or sawtooth thin line can be present, where the local height of the line and angle on the carousel can be assigned unequivocally. By determination of the height of the line with the aid of an optical, magnetic or other sensor, in such a case, an essentially unequivocal assignment of the angle from a measuring signal can be performed.

In the invention or in its preferred further development, the position of the installation is known, even after shutdown, for example, caused by power failure, without having to start from a zero point, reference point or similar. Directly after turning on the installation, the actual position or a measure for it can be obtained from the sensor. This does not have to be calculated with expenditure with the aid of stored data, but it is directly available after reading the sensor. In conventional installations, in which position recognition is provided with the aid of a responder, after shutdown, first a reference point has to be established.

In order to verify the occupation of the milking station by an animal, it is proposed to have an identification of the animal located at the milking station. The identification of the animal can be done at the milking station itself. In order to reduce the technical expenditure, it is proposed that the identification of the animal be made in the access path.

According to another inventive idea, a carousel milking facility with a number of milking stations arranged on a movable or rotatable platform is proposed. The milking facility can be, for example, a carousel milking facility, which has a position detection unit, or also a central device which determines the position or angular change of the platform relative to a reference point.

Preferably, the position of at least one milking station is determined. The position detection unit or the central device, too, preferably has at least one position sensor or also an angle sensor. The use of several (angle) sensors has the advantage that a redundancy is achieved. As a result of this, increased safety regarding the determination of the position of the milking station is attained.

According to an advantageous embodiment of the method, the reference point can be defined as storing the position information in a reference position of the carousel or as a physical marking which can be detected with a sensor. According to the invention, such a device should have to be started up only during the first start-up for calibration.

Calibration can be carried out, for example, on a pass-by antenna, which can also serve for position recognition of the animals. Such a pass-by antenna can be provided, for example, at a certain angle after entry, for example, of a milk carousel, so that the assignment of the animal and position is ensured. While such an antenna is normally used for animal recognition, it can be used additionally for checking the calibration or also for plausibility control.

According to an advantageous further development of the carousel milking facility, it is proposed that the device be connected to the platform directly or indirectly. The connection can be a mechanical one. However, this is not absolutely necessary. The connection can also be electrical and/or optical.

According to still another advantageous embodiment of the (carousel) milking facility, it is proposed that the device be connected to a unit that can be rotated around the axis of rotation of the platform, or to a position detection unit. The advantage of this embodiment of the carousel milking facility can be regarded in the fact that the device is arranged on a component in the center, which rotates with the platform, and thus angle determination of the milking stations is achieved.

At least one drive unit is provided in the drive of (carousel) milking facility. The device through which a position or angle change of the platform relative to a reference point is determined, can be connected alternatively or additionally to a drive unit.

In order to increase the accuracy of the angle determination, the device preferably has a gear system. The gear system can be a reducing gear system or an increasing gear system. With the gear system of the device, an improvement in the ability of the system to provide information about the (angular) velocity of the platform is achieved.

According to a still other advantageous embodiment of the (carousel) milking facility, it is proposed that the device be connected to a control and/or regulating device. As a result of this, actual data and the positions of the milking stations resulting from it are transmitted to the control and/or regulating unit, as a result of which the control and/or regulating unit can trigger different actions. Hereby, we are concerned, for example, by stopping of the carousel, descending of the teat cup cluster or also pulling up the teat cup cluster. Furthermore, there is a possibility to vary the speed of the platform as a function of the occupation of the milking stations.

According to still another advantageous embodiment of the (carousel) milking facility, it is proposed that the identification means be provided for the identification of the animals located in the milking station. These identification means are arranged so that they identify the cow at the milking station. In order to reduce the technical expenditure and expenditure for the apparatus, the arrangement of the identification means is placed in the access path.

In order to determine the angle and/or (angular) velocity, the device preferably has at least one computer, especially a microcomputer. The evaluation of the position detection occurs in this. Using a computer, the possibility can also be created to provide information to the operating personnel about the actual (angular) velocity. In addition, data can be stored from previous milking processes, operating situations and operational information, which can be recalled.

The control and/or regulating device preferably has a computer. As a result of this, precise position start and control of the carousel is made possible. The information regarding the position of the milking stations can also be used for making decisions during an automated process or to provide aid for a decision, where manual access is possible, for progress in the milking carousel as well as for display of status information.

As a result of the fact that the device and/or the control and/or regulating device has a computer, with a suitable method, correction values can be used as compensation for mechanical irregularities. Here, corresponding correction tables can be taken into consideration for position correction. Thus, the position at the periphery of the milking parlor or of the carousel or of other selected points can be determined accurately, even when manufacturing tolerances or inaccuracies in the construction of the (carousel) milking facility would lead to errors in central position or angle determination. In order to provide the compensation, again special marks can be used where the detection of these supports the automatic adjustment of the compensation.

In a preferred further development, the actual power uptake of the drive is recorded. Preferably, the actual power uptake is set with reference to the characteristic power uptakes. A characteristic power uptake describes a power uptake which is characteristic for the actual operational state. Different informational data and measured values can be used for the determination of the characteristic operational state.

In a single case, for example, the actual rotational speed as well as any accelerations or decelerations are taken into consideration. The consideration of the number of animals on the platform is also possible.

From such data, based on a comparison of the actual power uptake with the derived characteristic power uptake, a measure can be obtained to determine whether or not the actual power uptake corresponds to the actual operational state. Preferably, the speed is rechecked, that is, the actual power uptake is adjusted so that a desired velocity is obtained.

When deviations of the actual power uptake from the characteristic power uptake occur, which exceed a permissible degree (for example, 20 or even 50%) a warning signal can be issued. Such an excessive value can indicate, for example, contamination of the drive system or even leakage. Thus, with this further development of the invention, recognition of operation-related influences on the rotating velocity is possible.

Other details and advantages of the method according to the invention or of the milking facility according to the invention are explained with the aid of the preferred practical example of a carousel milking facility, shown in the drawing.

The following are shown:

Figure 1:
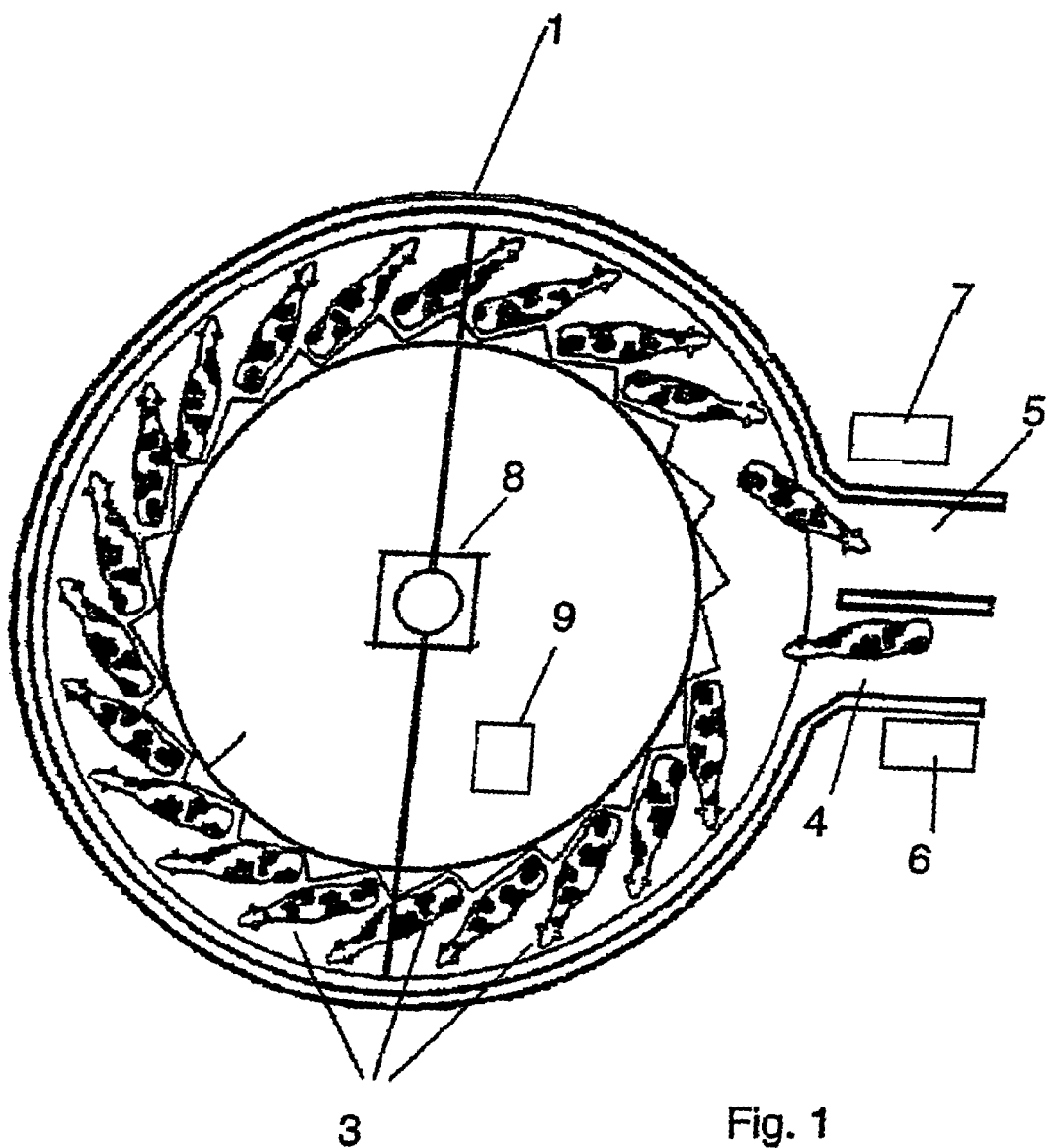
FIG. 1 is a carousel milking facility in a top view.

FIG. 1 shows a carousel milking facility 1. The carousel milking facility has a circular platform 2. A multiplicity of milking stations 3 are formed on platform 2. The milking stations 3 are built separately from one another.

An identification means 6 is arranged in an access path 4, through which the identification of a cow is made possible when this cow enters the carousel milking facility 1.

At an exit 5, a monitoring device 7 is arranged. Among others, with the aid of this monitoring device 7, it is determined, if an animal, especially a cow, leaves the carousel milking facility 1.

A central position detection unit 8, 15 is arranged at the center of the carousel milking station 1, this unit can be rotated around a rotational axis of platform 2. The unit 8 as well as the platform 2 is coupled with one another so that they are rotated synchronously to one another. The direction of rotation of platform 2 as well as of unit 8 is represented by the arrow in FIG. 1.

In order to operate the carousel milking facility 1, a control station 9 is arranged in a central region and this can be operated by an operator. The control station 9 may also contain display equipment and instruments from which the actual milking situation at the individual milking stations can be recalled. Furthermore, the actual status of the milking facility can be checked at the control station 9.

Figure 2:
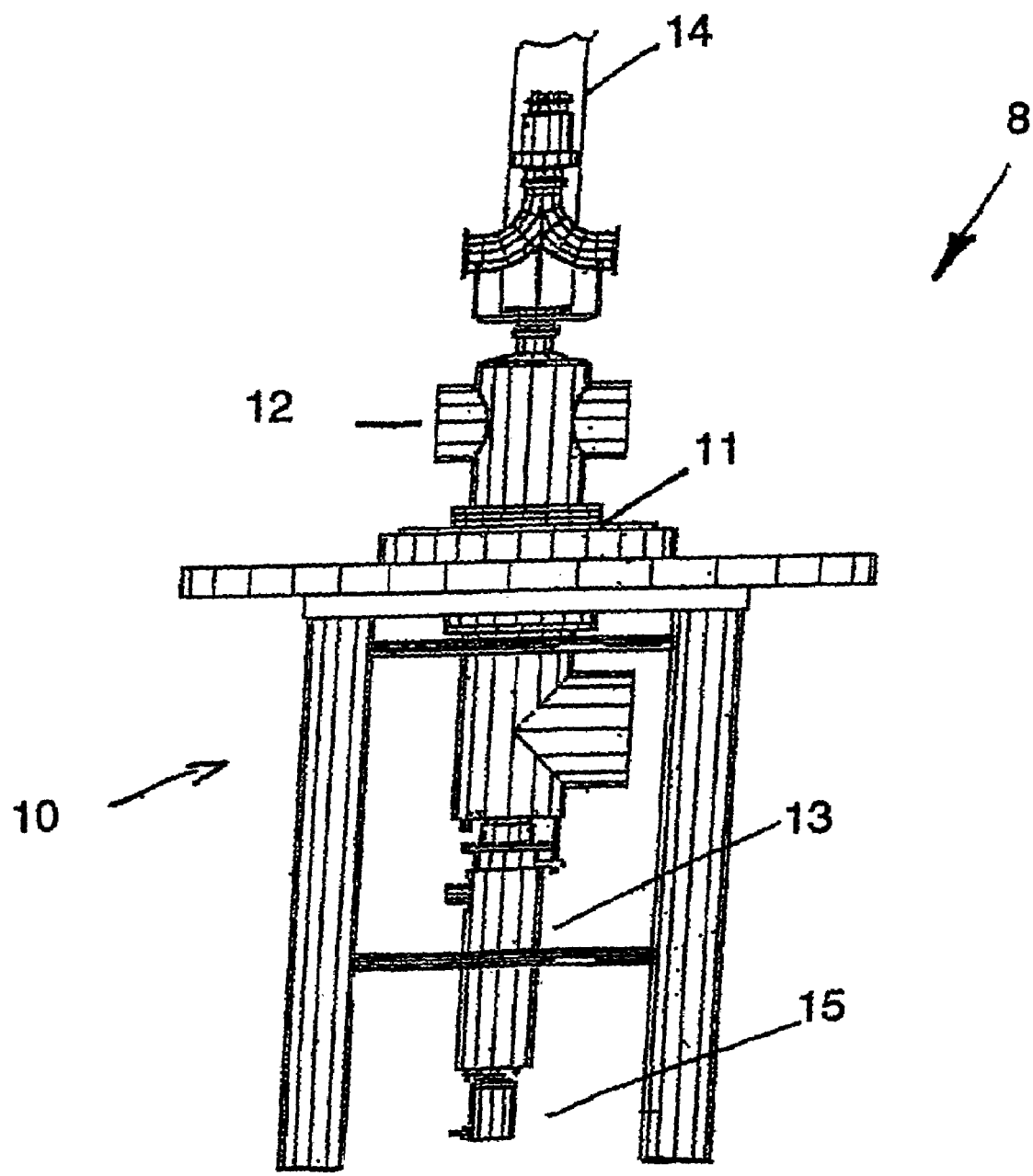
FIG. 2 is a schematic illustration of a central unit of a carousel milking facility.

FIG. 2 shows a practical example of unit 8. Unit 8 has a stand 10 which has a fixed position. The stand 10 has a radial bearing 11, which serves for supporting a supply unit 14. The supply unit 14 is essentially designed in a tubular shape, which is arranged coaxially to the axis of rotation of the carousel milking facility. The lead-in lines and lead-out lines necessary for the operation of the carousel milking facility are arranged within the supply unit 14. Reference number 14 also designates a rotary vacuum coupling. A slip ring translator 13 is arranged below the radial bearing 11.

In order to determine an angular change of the platform 2 relative to a reference point, a device 15 is provided which is connected to supply unit 14. The device 15 includes at least one angle sensor, so that the angular change of platform 2 and thus the position of at least one milking station 3 are determined.

Figure 3:
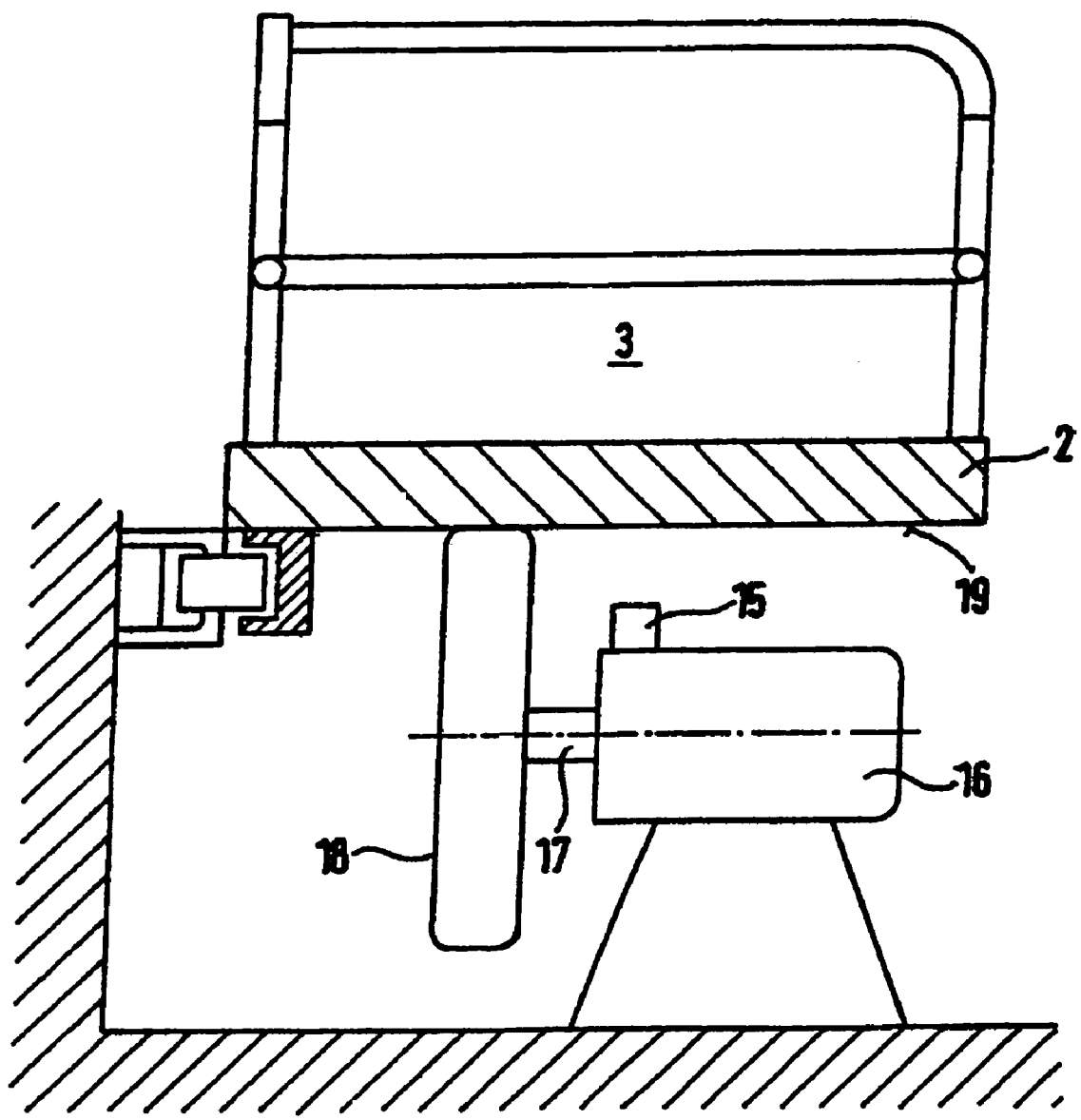
FIG. 3 is a schematic and cross-sectional illustration of a carousel milking facility with a drive unit.

Alternatively, or additionally, the device 15 can be arranged on a drive unit 16, as can be seen from FIG. 3. In the practical example according to FIG. 3, the drive unit 16 is an electric motor which has a drive shaft 17. A frictional wheel is connected to drive shaft 17. The frictional wheel attaches at the bottom side 19 of platform 2. In order to reduce slip between frictional wheel 18 and the bottom side 19 of platform 2, the bottom side 19 can be provided with a coating that has a high frictional coefficient. The drive unit 6, shown in FIG. 3, is an example of the design of a drive unit for a carousel milking facility. However, it is also possible to drive platform 2 with hydraulic motors. These hydraulic motors are supplied by a hydraulic pump driven by an electric motor.

The carousel milking facility according to the invention provides the advantage that the disadvantages in the state of the art are overcome. When using frictional wheels in the state of the art, the position of a carousel is not known accurately due to the slip between the driving means and the carousel. Also, a different air pressure in the driving frictional wheels leads to inaccurate knowledge about the position. The invention provides significant advantages in this regard.

Figure 4:
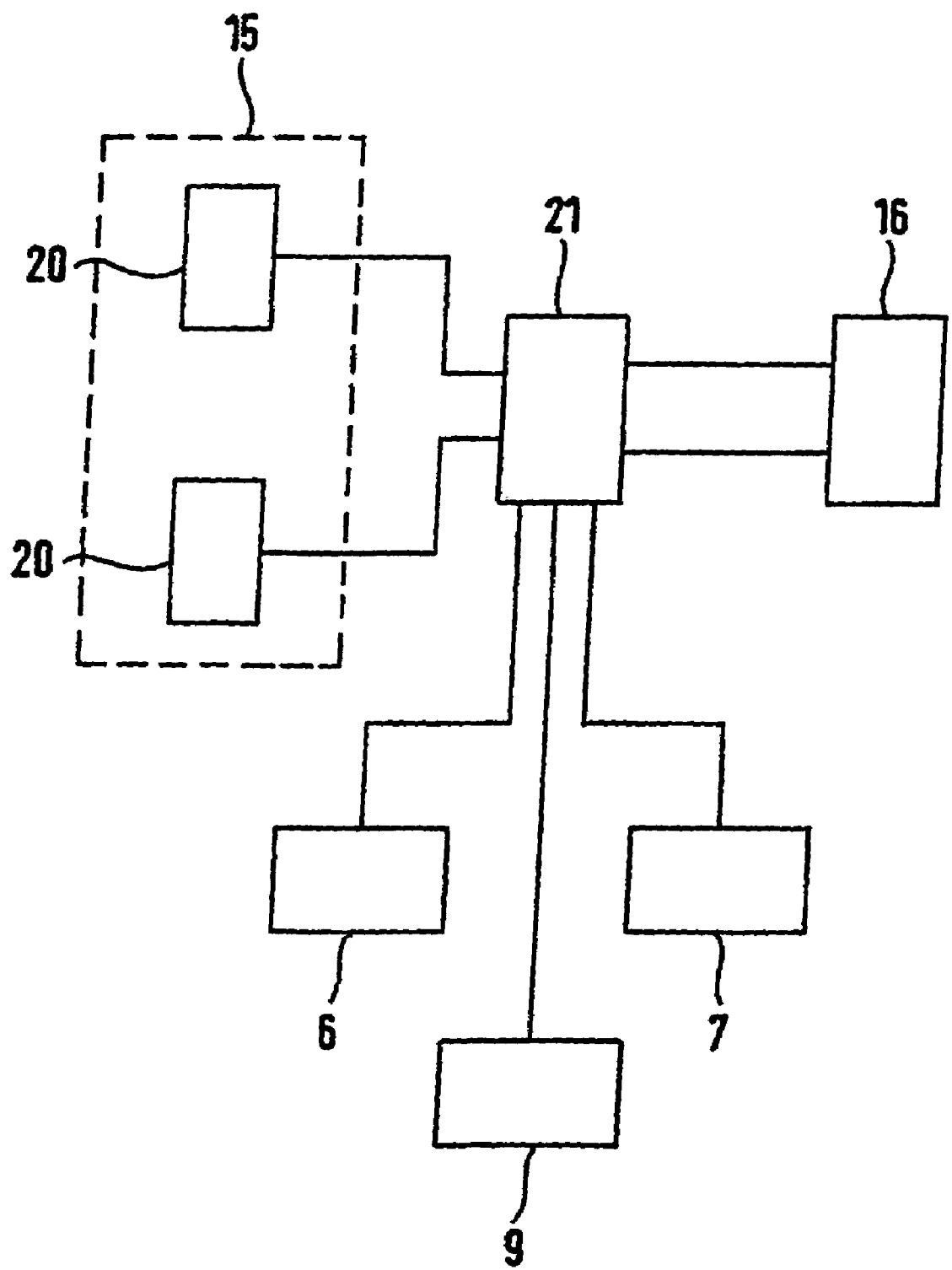
FIG. 4 is a schematic block diagram.

A block diagram is shown schematically in FIG. 4. The device 15 has two angle sensors 20. The angle sensors 20 are connected to a control and/or regulating device 21 through signal lines.

The identification means 6 and the monitoring device 7 are also connected to the control and/or regulating unit 21.

The control and/or regulating unit 21 is connected to drive unit 16 for controlling the angular velocity of platform 2.

LIST OF SYMBOLS 1 carousel milking facility
2 platform 3 milking station
4 access path
5 exit
6 identification means
7 monitoring device
8 unit
9 control station
10 stand
11 radial bearing
12 rotary vacuum coupling
13 slip ring translator
14 supply unit
15 device
16 drive unit
17 drive shaft
18 traction wheel [Reibrad in the text, Treibrad here in the list]
19 bottom surface
20 angle sensor
21 control- and regulating unit

The invention claimed is:

1. A method for operating a milking facility with at least two milking stations arranged on a movable platform comprising the steps of:
   changing a position of the platform relative to a reference point; and
   determining a change in the position of the movable platform with the aid of a position detection unit having an angle sensor.

2. The method according to claim 1, and further comprising the step of:
   transmitting measured data from the position detection unit to a control unit.

3. The method according to claim 1, and further comprising the step of determining occupation of a milking station by identifying an animal located at the milking station.

4. The method according to claim 3, wherein the step of identifying the animal is done in an access path related to a milking station.

5. The method according to claim 1, wherein the movable platform is a rotating platform.

6. A method for operating a milking facility with at least two milking stations arranged on a movable platform comprising the steps of:
   changing a position of the platform relative to a reference point;
   determining a change in the position of the movable platform with the aid of a position detection unit; and
   determining a velocity of the movable platform.

7. The method according to claim 6, and further comprising the step of:
   altering the velocity of the movable platform as a function of the operational situation in at least one milking station.

8. A method for operating a milking facility with at least two milking stations arranged on a movable platform comprising the steps of:
   changing a position of the platform relative to a reference point; and
   determining a change in the position of the movable platform with the aid of a position detection unit; and
   wherein the step of:
   determining the change of position corresponds to determining an angular change in the movable platform position.

9. A method for operating a milking facility with at least two milking stations arranged on a movable platform comprising the steps of:
   changing a position of the platform relative to a reference point; and
   determining a change in the position of the movable platform with the aid of a position detection unit; and
   wherein the step of:
   determining the change of position is measured with the aid of a position detection unit having at least one sensor, which is taken from a group of sensors selected from the group consisting essentially of: an angle sensor, an absolute angle encoder, an incremental angle encoder, an angle encoder, and a multi-turn shaft encoder.

10. A milking facility comprising:
    a plurality of milking stations, arranged on a movable platform; and
    a position detection device for detecting a change of position of the platform, wherein
    the position detection device detects angular change.

11. The milking facility according to claim 10, wherein the position detection device is a central position detection device.

12. The milking facility according to claim 10, wherein the movable platform can be rotated.

13. The milking facility according to claim 10, wherein the position detection device has at least one sensor which is taken from a group of sensors consisting essentially of: angle sensors, absolute angle encoder, incremental angle coder, and a multi-turn shaft encoder.

14. The milking facility according to claim 10, wherein the milking facility is a carousel milking facility.

15. The milking facility according to claim 10, wherein the position detection device is connected to the platform.

16. The milking facility according to claim 15, and further comprising an animal detector disposed to identify an animal at the milking station.

17. The milking facility according to claim 10, wherein a control device is computer-automated.

18. The milking facility according to claim 17, wherein the detection device is connected to the control device.

19. The milking facility according to claim 17, wherein a drive unit is connected to the control device.

20. The milking facility according to claim 10, wherein an animal detector senses an animal on the milking station.

21. A milking facility comprising:
    a plurality of milking stations, arranged on a movable platform; and
    a position detection device for detecting a change of position of the platform; and
    wherein the position detection device is connected to a rotatable unit.

22. A milking facility comprising:
    a plurality of milking stations, arranged on a movable platform; and
    a position detection device for detecting a change of position of the platform; and
    wherein the position detection device is connected to at least one movable platform drive unit.

23. A milking facility comprising:
    a plurality of milking stations, arranged on a movable platform; and
    a position detection device for detecting a change of position of the platform; and
    wherein the position detection device comprises a gear system.

* * * * *